June 10, 1969 F. C. MARINO 3,449,593

SIGNAL SLOPE DERIVATIVE DETECTION APPARATUS

Filed Oct. 26, 1964

INVENTOR.
Francis C. Marino

BY

G. C. Yuter

ATTORNEY

United States Patent Office 3,449,593

Patented June 10, 1969

3,449,593

SIGNAL SLOPE DERIVATIVE DETECTION APPARATUS

Francis C. Marino, Huntington, N.Y., assignor to Digitronics Corporation, Albertson, N.Y., a corporation of Delaware Filed Oct. 26, 1964, Ser. No. 406,495

Int. Cl. H03b *3/04;* H03k *17/00*

U.S. Cl. 307—235 11 Claims

ABSTRACT OF THE DISCLOSURE

Single slope derivation detection apparatus comprising a signal differentiating means and a bistable amplifying means which detects the zero crossing of the differentiated signal.

Figure 1:
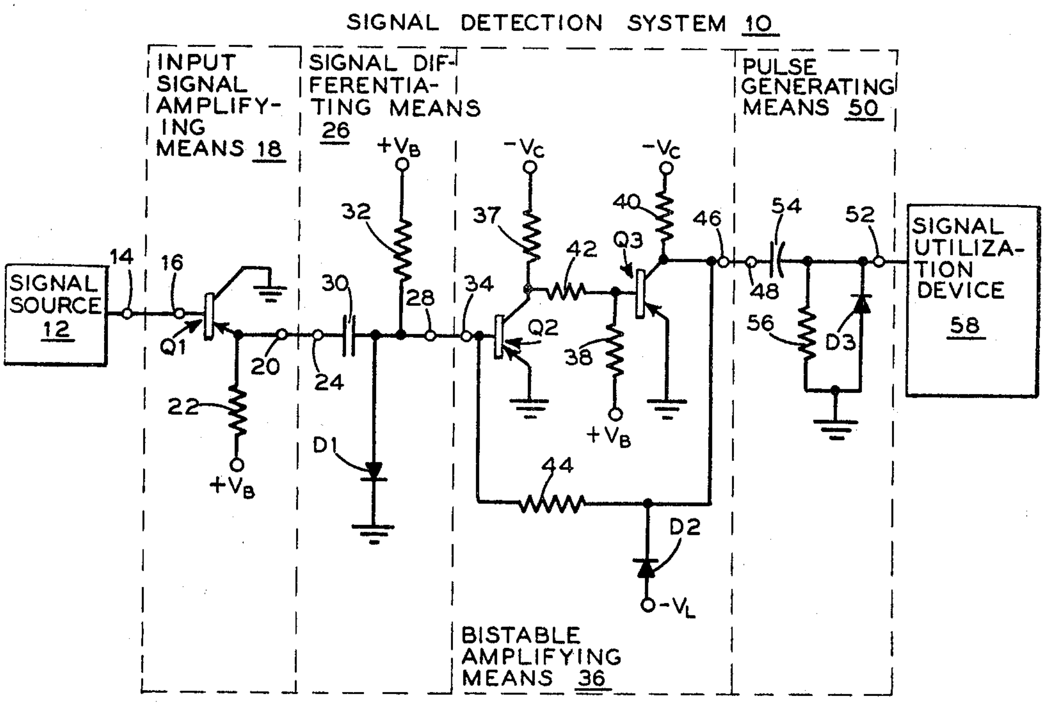

This invention pertains to signal detection apparatus and, more particularly, to apparatus for detecting the peaks in amplitude varying signals.

Signal detection apparatus is used in many electronic systems, such as radar systems and data processing system, for example. Quite often in digital computer or data processing systems there are storage elements employed which include magnetic storage media, either in the form of magnetic drums or magnetic tapes. Information data is recorded on the magnetic medium as a series of magnetized areas, each representing a binary unit or bit of information. When the storage medium is moved past a magnetic reproducing head, the series of magnetized areas on the magnetic medium induce a signal voltage waveform in the reproducing head that contains the information originally recorded, although the signal waveform that is reproduced in and transmitted from the head is not an exact replica of the signal waveform initially recorded. The problem is to extract the recorded information from such reproduced signal waveform as is reproduced by the magnetic reproducing head.

Many signal detecting techniques have been employed to recapture the information represented by the reproduced playback waveform. One conventional method is to clip the signal waveform and then feed this clipped signal waveform to a trigger circuit for detection. While this method may be adequate for low pulse density magnetic recordings, it is unsuitable and inadequate at very high density information rates.

Accordingly, when high density magnetic recordings are reproduced, different techniques are employed to extract the information. One common technique is to detect the amplitude peaks in the reproduced signal waveform, since the peaks are less prone to relative time displacements caused by the combinations of data bits that had been recorded.

However, most peak-sensing circuits are sensitive to serious distortions of a given input waveform because they are basically "zero-slope" detectors. That is, they are designed to generate an output at the peak of an input signal which is normally distinguishable by a zero-slope at the peak of the signal independent of signal amplitude or shape. However, significant distortions in the basic waveform can produce slopes approaching zero at other points along the waveform in addition to the peak of the signal resulting in "early" or "additional" output signals. Since these distortions are appreciable nearer the base line of a typical playback signal, conventional peak-sensing circuits avoid the heavy distortion area by employing clipping levels on the order of 20%.

In addition, conventional peak-sensing circuits cannot be employed in very low tape speed applications (under 3 inches per second) where such distortions easily appear throughout the entire waveform up to and including the peak of the waveform.

It is accordingly a general object of the invention to provide an improved system for detecting the peaks in amplitude varying signals.

It is another object of the invention to provide a signal detector system which is relatively insensitive to the times of occurrence of the voltage peaks in the signal.

It is a further object of the invention to provide a signal peak detector which is insensitive to the times of occurrence of the peaks in the amplitude of signals and which is also insensitive to any noise signals superimposed on the signal representing information.

It is a more specific object of the invention to provide a signal peak detector suitable for use in the reproducing circuitry of a magnetic recording system, with the peak detector characterized to be insensitive to any effects resulting from various binary combinations of the data stored in the recording medium of the system, and also to be insensitive to any noise in the signal reproduced from and representing the stored data.

It is another more specific object of the invention to provide a signal peak detector which when incorporated in a high density magnetic tape recording system of the NRZI type has excellent peak-sensing ability but is insensitive to serious distortions in the basic playback signal waveform.

It is a further more specific object of the invention to provide a signal peak detector wherein playback signals in a NRZI recording system require a minimum of clipping, e.g. less than 5%, prior to detection.

It is yet a still further more specific object of the invention to provide a signal peak detector for use in magnetic tape NRZI recording systems wherein the tapes may be moved at speeds below 0.5 inch per second.

Briefly the invention contemplates detecting information represented by a signal waveform which varies in accordance with the information contained in the waveform. The information is detected by sensing for changes in the polarity of the time derivative of the amplitude of the signal waveform.

Additionally, the invention contemplates the provision of signal detection apparatus which includes signal differentiating means having an input terminal for receiving a signal and an output terminal for transmitting a signal which is the time derivative of the received signal. Connected to the output terminal of the signal differentiating means is a bistable amplifying means. The bistable amplifying means has two stable states and changes stable states only when the polarity of the signal transmitted from the output terminal of the signal differentiating means changes. The transition between stable states is used to indicate the detection of a signal.

Other objects, the features and advantages of the invention will be apparent from the following detailed description when read with the accompanying drawings which show by way of example and not limitation a now preferred embodiment of the invention.

Figure 2:
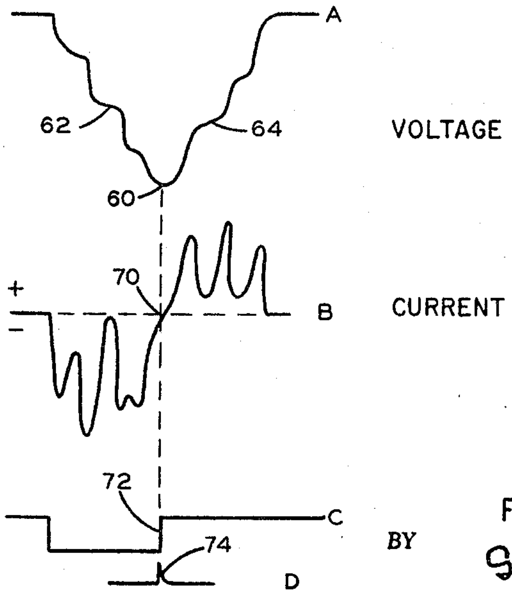

In the drawings:

FIGURE 1 shows a schematic diagram of a signal detection system for practicing the invention; and FIGURE 2 shows signal waveforms at particular points in the signal detection system of FIGURE 1.

Referring now to the drawings, a signal detection system 10 is shown comprising a signal source 12 which generates signals of the type indicated in waveform A of FIGURE 2. The signals represent, for example, binary information as playback signals from a NRZI (non-return-to-zero) magnetic recording system. If such is the case, then signal source 12 would include a magnetic tape driven by a tape transport past a magnetic reproducing head which is connected to conventional amplifying and clipping circuits.

The output terminal 14 of signal source 12 is connected to the input terminal 16 of signal amplifying means 18 which is a conventional emitter-follower amplifier including a transistor Q1 having a grounded collector, a base connected to input terminal 16 and an emitter connected via resistor 22 to sources of positive voltage $V_B$. The output terminal 20 of input signal amplifying means 18 is connected to the emitter of transistor Q1. The output resistance $R_e$ of input signal amplifying means 18 is effectively the resistance of resistor 22 which should be as small as permitted by the output of signal source 12 and the characteristics of transistor Q1.

The output terminal 20 of input signal amplifying means 18 is connected to the input terminal 24 of signal differentiating means 26. Signal differentiating means 26 transmits from its output terminal 28 a capacitive current represented by waveform B which is the time derivative of the input voltage waveform A. Signal differentiating means 26 includes: capacitor 30 connected between input terminal 24 and output terminal 28; resistor 32 connecting output terminal 28 to source of positive potential $V_B$; and diode D1 connecting output terminal 28 to ground (reference voltage). Good operating response requires that capacitor 30 have a capacitance $C_p$, in farads, substantially equal to ⅛F $R_e$, where F is the input signal frequency which for a NRZI magnetic tape recording system is the product of the packing density in bits per inch of tape and the speed of tape movement in inches per second. Diode D1 is included to provide a low impedance recovery (discharge) path for capacitor 30.

The output terminal 28 of signal differentiating means 26 is connected to the input terminal 34 of bistable amplifying means 36, a current-switched bistable amplifier which transmits from its output terminal 46 signals represented by waveform C. Bistable amplifying means 36 comprises: transistor Q2 having a base connected to input terminal 34, a grounded emitter, and a collector connected via resistor 37 to source of negative potential $V_C$; transistor Q3, having a base connected via resistor 38 to source of positive potential $V_B$, a collector connected via resistor 40 to source of negative potential $V_C$, and a grounded emitter; a resistor 42 connecting the collector of transistor Q2 to the base of transistor Q3; and a feedback resistor 44 connecting the collector of transistor Q3 to the base of transistor Q2. The output terminal 46 of bistable amplifying means 36 is connected to the collector of transistor Q3. If the load connected to the output terminal 46 dynamically varies it is desirable to apply a clamping voltage to the collector of transistor Q3 in order to regulate the voltage applied to feedback resistor 44. In such a case, a diode D2 connects the collector of transistor Q3 to a source of negative clamping potential $V_L$.

It has been found that good operation of the bistable amplifying means 36 requires that the resistance $R_F$, in ohms, of the feedback resistor 44 be less than $$V_L/\frac{V_C}{\beta_2 R_1}+\frac{V_B}{R_B}$$

where: $V_L$ is the magnitude, in volts, of the voltage of the source of clamping potential $V_L$; $\beta_2$ is the gain of transistor Q2; $R_1$ is the magnitude of the resistance, in ohms, of resistor 37; $V_B$ is the magnitude, in volts, of the voltage of source of positive potential $V_B$; and $R_B$ is the magnitude of the resistance, in ohms, of resistor 32. In addition, the resistance, in ohms, of resistor 40 should be no greater than $R_F(V_C/V_L-1)$, where: $R_F$ is the resistance of feedback resistor 44, in ohms; $V_C$ is the magnitude, in volts, of the voltage of source of negative $V_C$; and $V_L$ is as defined above. Furthermore, the sum of the resistances of resistors 37 and 42 should be no greater than $$V_C/\frac{V_C}{\beta_3 R_C}+\frac{V_B}{R_3}$$

where: $R_C$ is the resistance, in ohms, of resistor 40; $R_3$ is the resistance, in ohms, of resistor 38; $\beta_3$ is the gain of transistor Q3; and all other terms are as previously defined.

Bistable amplifying means 36 has a first stable state wherein transistor Q2 conducts and transistor Q3 is cut off, and a second stable state wherein transistor Q2 is cut off and transistor Q3 conducts. As will hereinafter be described, bistable amplifying means 36 switches stable states under the influence of current flow from signal differentiating means 26 and transmits from its output terminal 46 waveform C which alternates between two voltage levels.

The output terminal 46 of bistable amplifying means 36 is connected to the input terminal 48 of pulse generating means 50 which has an output terminal 52 and comprises: a differentiating capacitor 54 connecting input terminal 48 to output terminal 52; a resistor 56 connecting output terminal 52 to ground potential; and a diode D3 connecting output terminal 52 to ground potential. Accordingly, by virtue of the differentiating action of capacitor 54 and resistor 56 the voltage transitions received at input terminal 48 are shaped into sharply defined pulses whose polarity follows the direction of the voltage transitions. However, by virtue of the clipping action of diode D3 and its polarization, only the positive polarity pulses are transmitted to output terminal 52 which is connected to a signal utilization device 58.

A typical input signal waveform is shown by waveform A of FIGURE 2. In the magnetic recording systems under discussion it is necessary to detect the peak 60 since this is true indication of a recorded indicium such as a binary unit of information. Lobes such as 62 and 64 are spurious and should be ignored. Waveform B which is the derivative of the input signal represented by waveform A shows that as the input signal proceeds from its inception to peak 60, its derivative is negative. At peak 60, the polarity of the derivative changes from negative to positive (point 70 of waveform B). Waveform C which shows the voltage output of bistable amplifying means 36, changes level as the polarity of the derivative changes and specifically changes in a positive going direction (point 72 of waveform C) as the polarity of the derivative changes from negative to positive, or at the negative peak 60 of the input signal. The positive going transition of the voltage represented by waveform C is shaped into a pulse 74 (waveform D) by pulse generating means 54 and transmitted by output terminal 52 indicating the peak 60 of the input waveform.

From the above discussion it should be apparent that peaks in an input signal waveform whose amplitude varies in accordance with the binary units of information represented thereby can be detected by sensing for changes in the polarity of the derivative of the amplitude of the input signal waveform. The manner in which the above described apparatus performs this method will now be shown.

As the input signal waveform A is transmitted from signal source 12, it is amplified by input signal amplifying means 18 and differentiated by signal differentiating means 26. During the time between the start of the input signal waveform and the peak 60, its derivative is negative and the capacitive current flowing through output terminal 28 draws current from the base of transistor Q2 causing the latter to conduct. The collector of transistor Q2 approaches ground potential. The voltage divider action of resistors 42 and 38 cause the voltage at the base of transistor Q3 to be greater than the voltage of its emitter and transistor Q3 is cut off. The voltage of its collector is low (see waveform C). When the input signal reaches the peak 60, the charging current through capacitor 30 is reduced to zero but for that instant of time the states of transistors Q2 and Q3 remain unchanged. However, as the input signal starts swinging positive away from peak 60 a reversing (discharging) current flows through capacitor 30 into the base of transistor Q2. This reverse current cuts off transistor Q2. As transistor Q2 cuts off its collector voltage drops, forward biasing the base-emitter junction of transistor Q3 which starts conducting. As transistor Q3 starts conducting, its collector voltage rises (see waveform D). The rise in collector voltage is fed via feedback resistor 44 to the base of transistor Q2 to further raise the base voltage of the latter. The action continues until transistor Q2 is cut off and transistor Q3 is full conducting. When transistor Q3 is conducting it sustains transistor Q2 to cut off by disabling the driving action of resistors 40 and 44. This permits resistor 32 to maintain a cut-off bias on the base of transistor Q2 even if there is serious distortion such as point 64 (see waveform A) on the trailing edge of the input signal waveform. This sustaining action is sufficiently powerful so that transistor Q2 is maintained cut off even if serious distortion causes the reversing current through capacitor 30 to reduce to zero any number of times or for any length of time thereafter. In fact, transistor Q2 will not conduct again until the current through capacitor 30 actually changes direction which only occurs at the leading edge of the next input signal, i.e. when the input signal waveform actually swings negative and its derivative changes polarity.

It should be recalled that when transistor Q3 switched from the cut-off state to the conducting state the voltage at its collector abruptly rose. The leading edge of the collector voltage is differentiated by capacitor 54 and resistor 56 of pulse generating means 50 to produce a positive going pulse that is transmitted from output terminal 52 to signal utilization device 58. The pulse (waveform D) occurs at the time of the peak 60 (waveform A). It should be noted that whenever transistor Q3 switches from the conduction to the cut-off state the differentiating action of capacitor 54 and resistor 56 would attempt to generate a negative going pulse. However, by virtue of the polarization of diode D3, output terminal 52 cannot go below ground potential, therefore any negative going pulses are clipped, i.e., short circuited to ground. Hence pulse generating means 50 only transmits selected pulses and, in fact, only those pulses resulting from the occurrence of negative peaks in the input signal waveforms.

There has thus been shown improved signal detecting apparatus which by sensing for changes in the polarity of the time derivative of the input signal waveform can reliably detect peaks in the waveform with minimum of clipping. In fact, the apparatus when incorporated in NRZI magnetic tape reading systems permits the reading of information from tapes having packing densities approaching a thousand bits per inch with tape speeds ranging from a quarter to seventy five inches per second. The apparatus accomplished these results with clipping levels set as low as 3% as opposed to the usual 20% even during read-after-write operations.

While only one embodiment of the invention has been shown and described in detail, there will now be obvious to those skilled in the art many modifications and variations which while satisfying many or all of the objects of the invention do not depart from the spirit of the invention as defined in the appended claims. For example, while the described embodiment provides output pulses at the peaks of negative-going input signals (positive derivative detection), it is obvious that by changing voltage polarities and employing NPN transistors instead of PNP transistors, output pulses can be obtained at the peaks of positive-going input signals (negative derivative detection).

What is claimed is:

1. Signal derivative transistion detection apparatus comprising input signal amplifying means including an input terminal adapted to receive an amplitude varying signal and an output terminal; a first current sensitive signal amplifier including an input terminal, an output terminal and a common terminal; means for applying operating voltages to the input, output and common terminals of said first signal amplifier; a differentiating capacitor directly connecting the output terminal of said input signal amplifying means to the input terminal of said first signal amplifier; a second current sensitive signal amplifier including an input terminal, an output terminal and a common terminal; means for applying operating voltages to the input, output and common terminals of said second signal amplifier; means for connecting the output terminal of said first signal amplifier to the input terminal of said second amplifier; signal feedback means connecting the output terminal of said second signal amplifier to the input terminal of said first signal amplifier; and output signal transmitting means connected to the output terminal of said second signal amplifier, said first and second current sensitive signal amplifying means providing a current.

2. The apparatus of claim 1 further comprising a unilateral conducting means connected to the input terminal of said first signal amplifier and polarized for discharging said differentiating capacitor.

3. The apparatus of claim 2 wherein said output signal transmitting means includes signal differentiating means polarity.

4. The apparatus of claim 1 wherein: said first signal amplifier is a transistor including an emitter, a collector and a base which are respectively the common, output and input terminals of said first signal amplifier; and said second signal amplifier is a transistor including an emitter, a collector and a base which are respectively the common, output and input terminals of said second signal amplifier.

5. Signal detection apparatus comprising: an input signal amplifier including an input terminal adapted to receive an amplitude varying signal and an output terminal; a first transistor including an emitter, a collector and a base; a first voltage means; a first resistor connecting the collector of said first transistor to said first voltage means; a reference voltage means; means for connecting the emitter of said first transistor to said reference voltage means; a second voltage means; a second resistor connecting the base of said first transistor to said second voltage means; a differentiating capacitor connecting the output terminal of said input signal amplifier to the base of said first transistor; a unilateral conducting device connecting the base of said first transistor to said reference voltage means; a second transistor including an emitter, a collector and a base; a third resistor connecting the collector of said second transistor to said first voltage means; means for connecting the emitter of said second transistor to said reference voltage means; a fourth resistor connecting the base of said second transistor to said second voltage means; a fifth resistor connecting the base of said second transistor to the collector of said first transistor; a sixth resistor connecting the collector of said second transistor to the base of said first transistor; and signal output means connected to the collector of said second transistor.

6. The apparatus of claim 5 wheerin said signal output means includes signal differentiating means and means for only transmitting signals of a given polarity.

7. The apparatus of claim 5 wherein said signal input means has an output resistance of magnitude $R_e$ ohms and the magnitude $C_p$ farads of the capacitance of said differentiating capacitor is substantially equal to $1/8R_eF$, where F equals the frequency of input signal variations.

8. The apparatus of claim 5 further comprising a clamping voltage means and means for connecting the collector of said second transistor to said clamping voltage means.

9. The apparatus of claim 8 wherein said third resistor has a magnitude at least equal to $R_F(V_C/V_L-1)$ where: $R_F$ is the magnitude of the resistance of said sixth resistor, in ohms; $V_C$ is the magnitude, in volts, of the voltage of said first voltage means; and $V_L$ is the magnitude, in volts, of said clamping voltage means.

10. The apparatus of claim 8 wherein said sixth resistor has a magnitude of at least equal to $$V_L / \frac{V_C}{\beta_2 R_1} + \frac{V_B}{R_B}$$

where $V_L$ is the magnitude, in volts, of the voltage of said clamping voltage means; $\beta_2$ is the gain of said second transistor; $R_1$ is the magnitude, in ohms, of the resistance of said first resistor; $V_B$ is the magnitude, in volts, of the voltage of said second voltage means; and $R_B$ is the magnitude, in ohms, of the resistance of said second resistor.

11. The apparatus of claim 8 wherein the sums of the resistances, in ohms, of said first and fifth resistors is no greater than $$V_C / \frac{V_C}{\beta_3 R_C} + \frac{V_B}{R_3}$$

where: $V_C$ is the magnitude, in volts, of the voltage of said first voltage means; $\beta_3$ is the gain of said third transistor; $R_C$ is the magnitude of the resistance, in ohms, of said third resistor; $V_B$ is the magnitude, in volts, of the voltage of said second voltage means; and $R_3$ is the magnitude, in ohms, of the resistance of said fourth resistor.

References Cited

UNITED STATES PATENTS

| | | | |
|---|---|---|---|
| 3,293,451 | 12/1966 | Henning et al. | 307—235 |
| 3,354,400 | 11/1967 | Heber et al. | 328—150 |
| 2,448,718 | 9/1948 | Koulicovitch | 328—150 |
| 3,016,469 | 1/1962 | Barret | 307—88.5 |
| 3,048,717 | 3/1962 | Jenkins | 307—88.5 |
| 3,073,968 | 1/1963 | Tribby | 307—88.5 |
| 3,171,041 | 2/1965 | Haase | 307—88.5 |
| 3,187,273 | 6/1965 | Chasek | 307—88.5 X |
| 3,214,606 | 10/1965 | Wilson | 307—88.5 |
| 3,217,183 | 11/1965 | Thompson et al. | 307—88.5 |

ARTHUR GAUSS, *Primary Examiner.*

J. D. FREW, *Assistant Examiner.*

U.S. Cl. X.R.

307—231; 328—115, 132, 150

UNITED STATES PATENT OFFICE
CERTIFICATE OF CORRECTION

Patent No. 3,449,593 June 10, 1969

Francis C. Marino

It is certified that error appears in the above identified patent and that said Letters Patent are hereby corrected as shown below:

Column 1, line 24, "system" should read -- systems --. Colu 3, lines 56 to 58, the formula should appear as shown below:

$$V_L/\left(\frac{V_C}{\beta_2 R_1} + \frac{V_B}{R_B}\right)$$

same column 3, line 68, "$R_F(V_C/V_L-1)$" should read -- $R_F((V_C/V_L)-1$ --; lines 73 to 75, the formula should appear as shown below:

$$V_C/\left(\frac{V_C}{\beta_3 R_C} + \frac{V_B}{R_3}\right)$$

Column 6, line 22, after "means", second occurrence, insert -- an means for transmitting signals of only a given --; line 58, "wheerin" should read -- wherein --; line 71, "$R_F(V_C/V_L-1)$" shoul read -- $R_F((V_C/V_L)-1)$ --. Column 7, lines 3 to 5, the formula should appear as shown below:

$$V_L/\left(\frac{V_C}{\beta_2 R_1} + \frac{V_B}{R_B}\right)$$

same column 7, lines 15 to 17, the formula should appear as shown below:

$$V_C/\left(\frac{V_C}{\beta_3 R_C} + \frac{V_B}{R_3}\right)$$

Signed and sealed this 27th day of October 1970.

(SEAL)
Attest:

EDWARD M.FLETCHER,JR.
Attesting Officer

WILLIAM E. SCHUYLER, JR.
Commissioner of Patents